US011979943B2

(12) United States Patent
Chou et al.

(10) Patent No.: US 11,979,943 B2
(45) Date of Patent: May 7, 2024

(54) PCI CONFIGURATION AND MOBILITY ROBUSTNESS OPTIMIZATION SON FUNCTIONALITY FOR 5G NETWORKS

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 17/167,522

(22) Filed: Feb. 4, 2021

(65) Prior Publication Data

US 2021/0243592 A1 Aug. 5, 2021

Related U.S. Application Data

(60) Provisional application No. 62/970,530, filed on Feb. 5, 2020, provisional application No. 62/971,124, filed on Feb. 6, 2020.

(51) Int. Cl.
*H04W 8/26* (2009.01)
*H04W 24/10* (2009.01)
*H04W 84/18* (2009.01)

(52) U.S. Cl.
CPC ............ *H04W 8/26* (2013.01); *H04W 24/10* (2013.01); *H04W 84/18* (2013.01)

(58) Field of Classification Search
None
See application file for complete search history.

(56) References Cited

U.S. PATENT DOCUMENTS

| 11,617,118 B2* | 3/2023 | Chou | H04W 36/0083 |
| | | | 370/331 |
| 2020/0322817 A1* | 10/2020 | Chou | H04W 24/04 |
| 2021/0014703 A1* | 1/2021 | Chou | H04W 74/0866 |

(Continued)

FOREIGN PATENT DOCUMENTS

KR 20170139034 A * 12/2017 ............. H04W 8/26

OTHER PUBLICATIONS

3GPP TS 38.331 V15.8.0 (Dec. 2019).*
3GPP TR 28.861 V2.0.0 (Dec. 2019).*

*Primary Examiner* — Christopher T Wyllie
(74) *Attorney, Agent, or Firm* — Schwegman Lundberg & Woessner, P.A.

(57) ABSTRACT

Systems and methods of re-configuring PCI values for a NR cell and performing mobility robustness optimization are described. To reconfigure the PCI values. The NRM data and the PCI of candidate cells measurements are analyzed to detect a potential PCI collision or PCI confusion among NR cells. In response to detection of the potential PCI collision or confusion, a new PCI value for at least one NR cell is determined and instructions to re-configure the at least one NR cell with the new PCI value are sent to a producer of provisioning MnS. For MRO, a NF provisioning MnS with modifyMOIAttributes operation to configure MRO targets for an MRO function and to enable the MRO function for a NR cell are consumed, as is a performance assurance MnS with a notifyFileReady or reportStreamData operation to collect MRO-related performance measurements. The measurements are analyzed to evaluate MRO performance.

16 Claims, 12 Drawing Sheets

(56) References Cited

U.S. PATENT DOCUMENTS

| | | | |
|---|---|---|---|
| 2021/0022061 A1* | 1/2021 | Chou | H04W 36/30 |
| 2021/0120473 A1* | 4/2021 | Yao | H04W 36/0083 |
| 2021/0160710 A1* | 5/2021 | Chou | H04W 74/0833 |
| 2021/0243592 A1* | 8/2021 | Chou | H04W 24/02 |
| 2023/0254887 A1* | 8/2023 | Elshafie | H04W 72/0446 370/329 |
| 2023/0389084 A1* | 11/2023 | Belleschi | H04W 74/0833 |

* cited by examiner

US 11,979,943 B2

PCI CONFIGURATION AND MOBILITY ROBUSTNESS OPTIMIZATION SON FUNCTIONALITY FOR 5G NETWORKS

PRIORITY CLAIM

This application claims the benefit of priority under 35 U.S.C. 119(e) to U.S. Provisional Patent Application Ser. No. 62/970,530, filed Feb. 5, 2020, and U.S. Provisional Patent Application Ser. No. 62/971,124, filed Feb. 6, 2020, each of which is incorporated herein by reference in its entirety.

TECHNICAL FIELD

Embodiments pertain to radio access networks. Some embodiments relate to Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to self-organizing networks (SON) for 5G networks. Some embodiments relate to Physical Layer Cell Identity (PCI) and mobility robustness optimization (MRO) use in 5G SON networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems. To add further complexity, a number of identifiers may be used at various points during the connection and communication processes in 5G networks. The available number of a particular identifier, however, may be limited. This may cause collision or confusion when the same identifier is simultaneously used by a particular cell or neighboring cells, which may be exacerbated due to the explosion of both network devices, such as $5^{th}$ generation NodeBs (gNBs) and UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
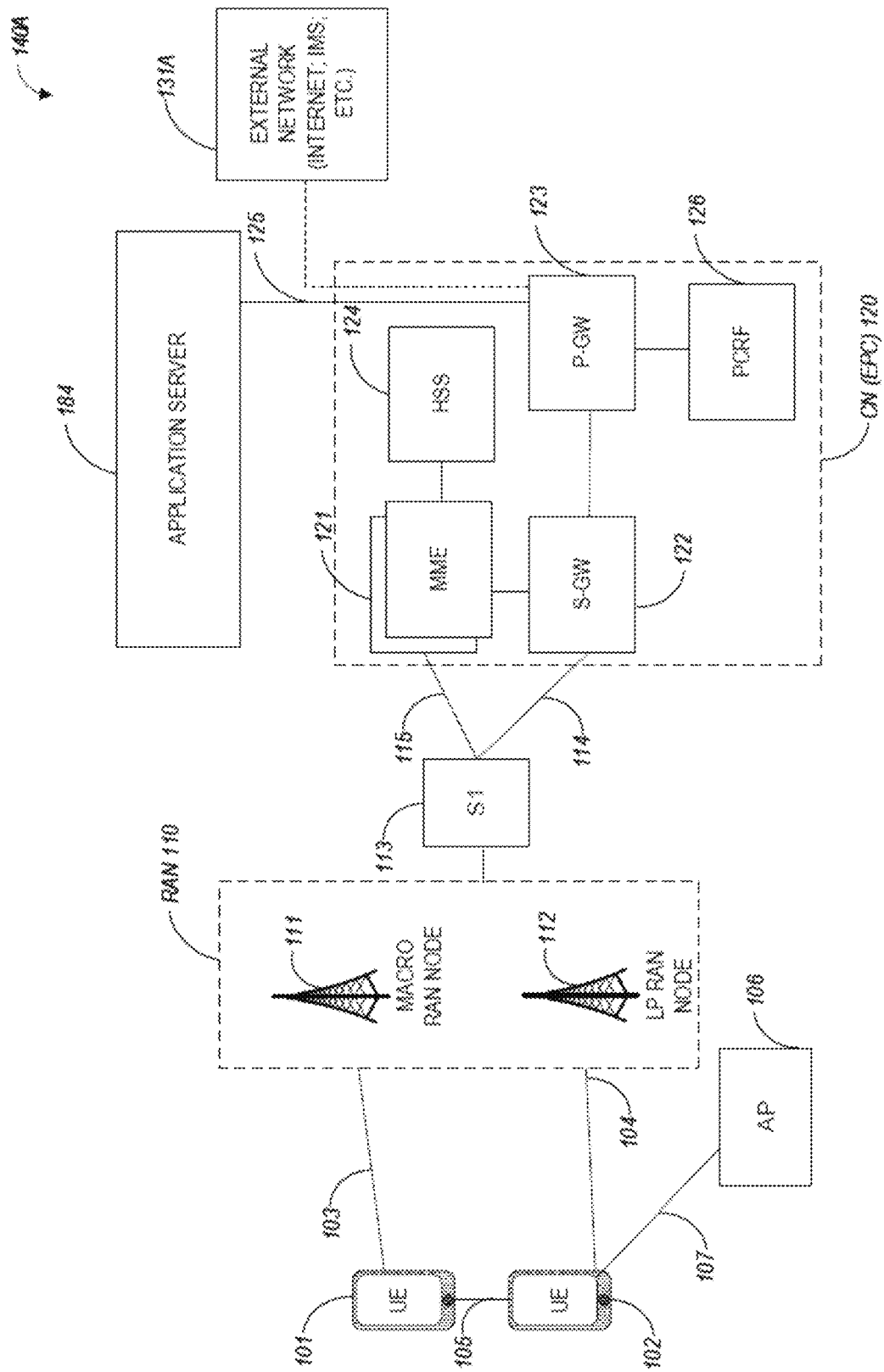
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below), in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 11 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UNITS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 50 new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
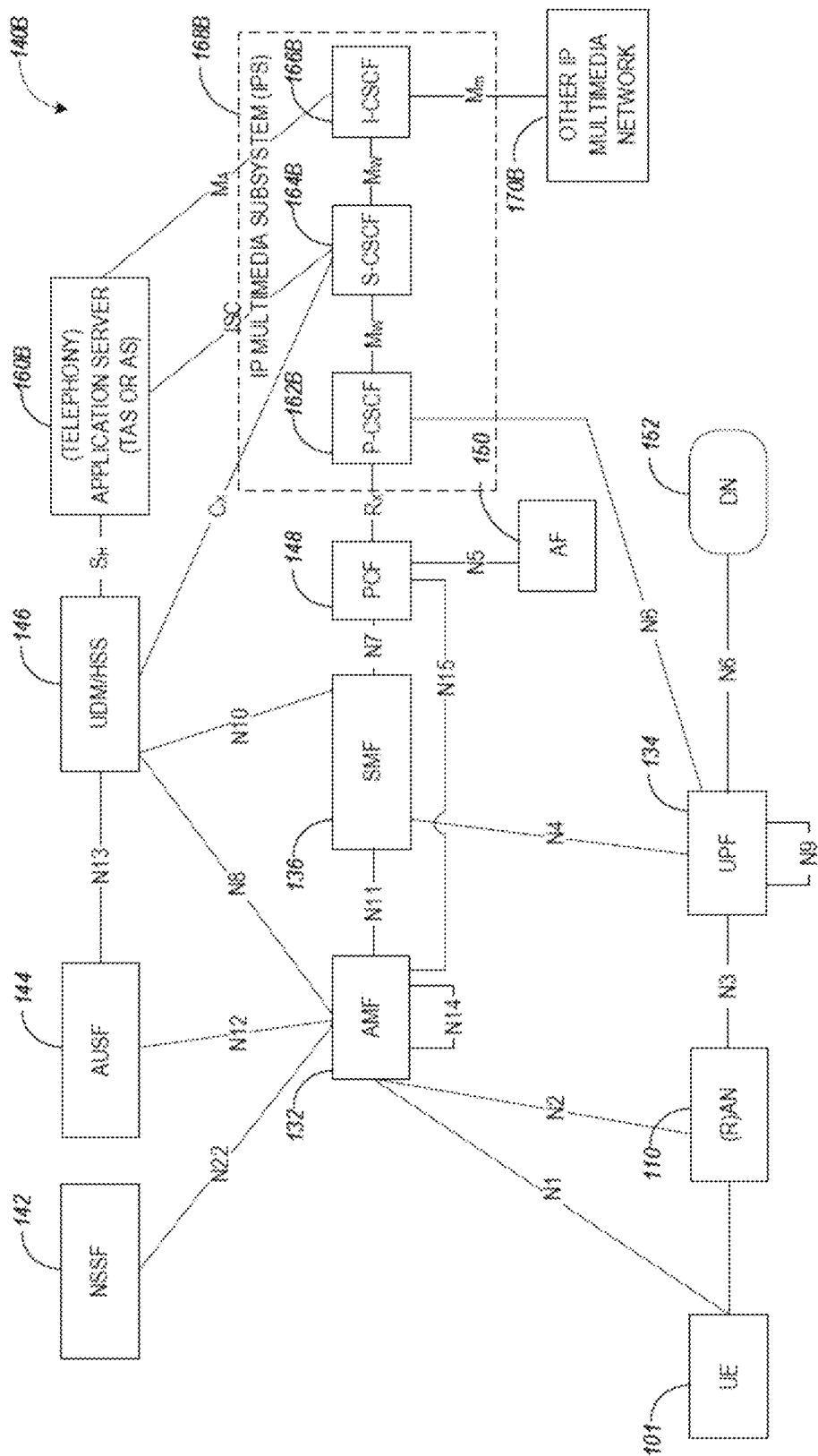
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
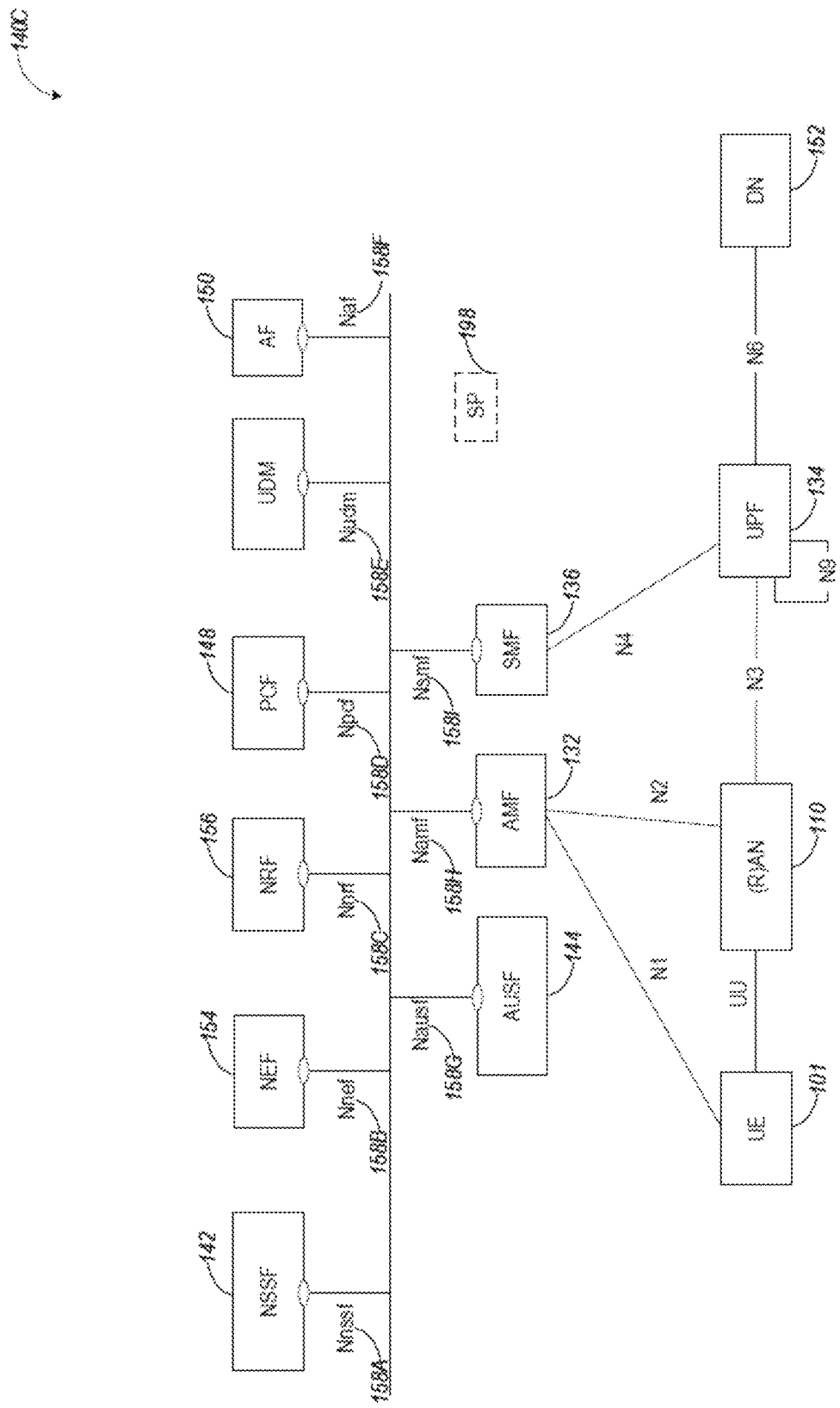
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points N1 or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
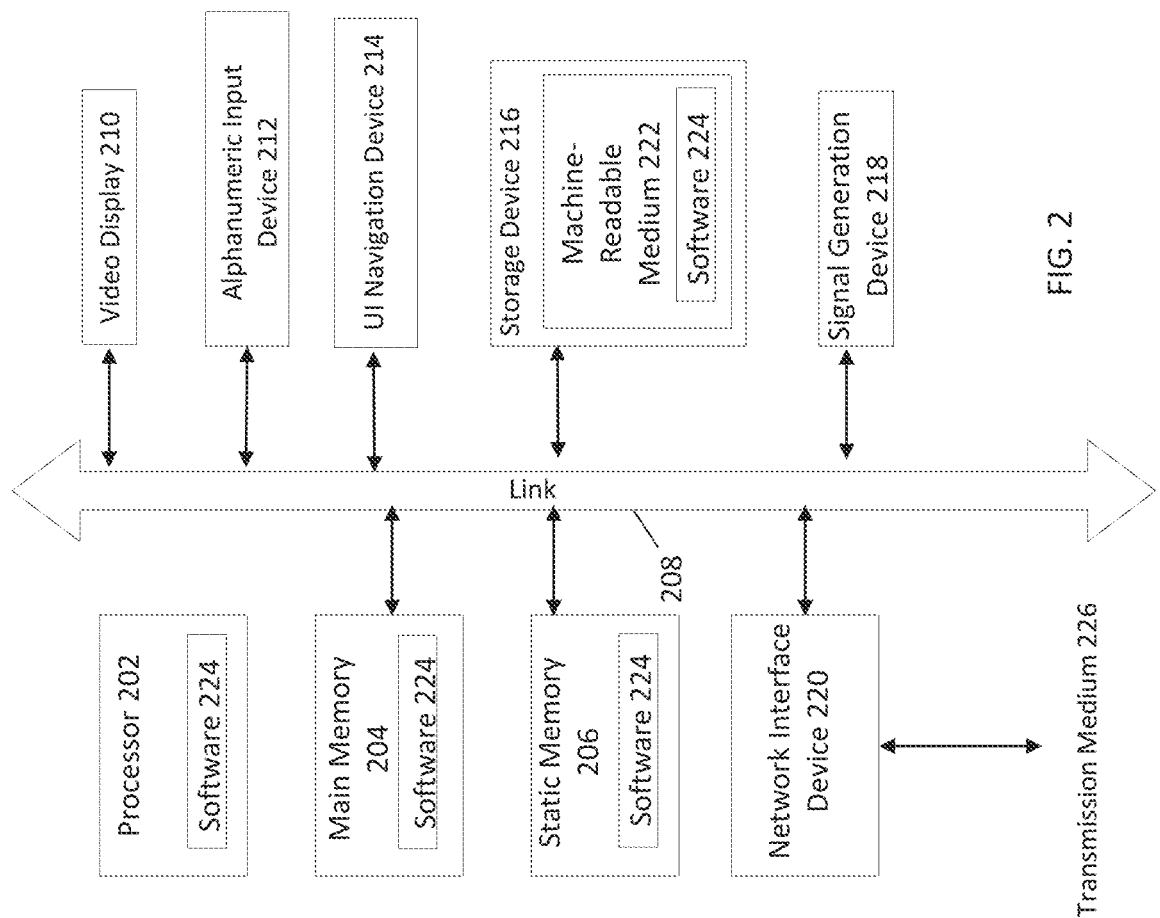
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks: Radio access Memory (RAM): and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
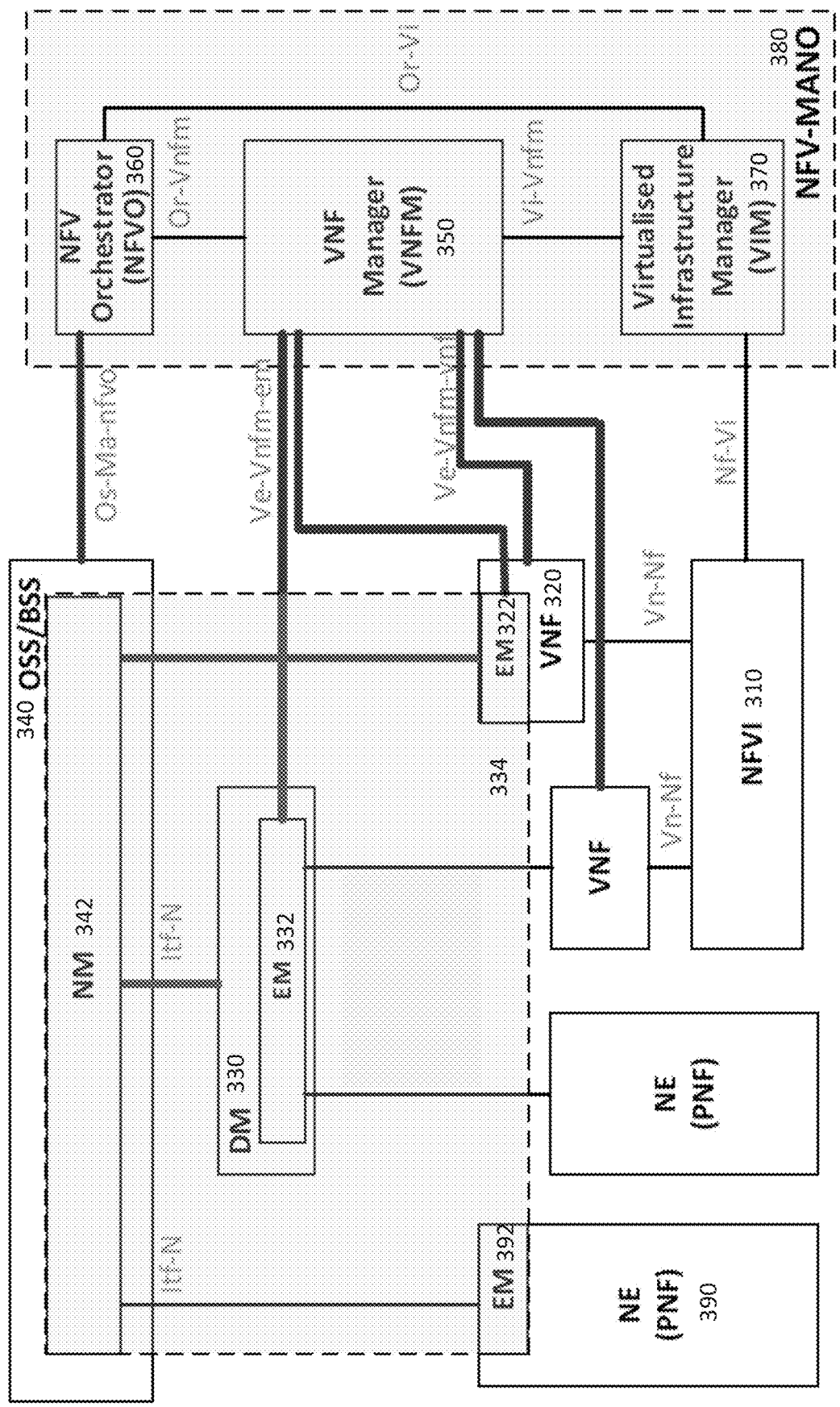
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, Network elements (NEs) 390, Virtual Network Functions (VNFs) 310, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANOs, may comprise a Virtualized Infrastructure Manager (VIM) 370, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 310 may be instantiated in one or more servers. Each of the VNFs 310, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 310 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VNFM 350 and the EMs and NM. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 310 of the same type or of different types. Thus, although only one VNFM 350 is shown in FIG. 3, different VNFMs 350 may be associated with the different VNFs 310 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 310 can be chained with other VNFs 310 and/or other physical network function to realize a network service. The virtualized resources may provide the VNFs 310 with desired resources. Resource allocation in the NFVI 310 may simultaneously meet numerous requirements and constraints, such as low latency or high bandwidth links to other communication endpoints.

The VNFs 310, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Vi-Vnfm interface may implement a virtualized resource performance/fault management on the Vi-Vnfm reference point.

Each gNB is assigned a Physical-layer Cell ID (PCI) that is broadcast in a Primary Synchronization Signal (PSS) and a Secondary Synchronization Signal (SSS). When a UE receives a PSS and SSS to acquire time and frequency synchronization, the UE also obtains the PCI that is used to uniquely identify a NR cell. There are 1008 unique PCIs (see clause 7.4.2 in TS 38.211 v16.0.0 (2020-01-11)). Therefore, PCIs are reused, as a massive number of NR cells and small cells operating in millimeter wave bands are deployed. Typically, operators use a network planning tool to assign PCIs to cells when the network is deployed to ensure all neighboring cells have different PCIs. However, due to the addition of new cells or changes of neighbor relations from automatic neighbor relation (ANR) functions, problems can arise, such as: PCI collision in which two neighboring cells have the same PCIs; and PCI confusion in which a cell has 2 neighboring cells with the same PCI value, where Cell #A has a PCI that is different from the PCIs of its two neighbors—Cell #B and Cell #C, but Cell #B and Cell #C have the same PCI. PCI confusion can impact the handover performance as UEs are confused as to which cell is the proper handover target.

Figure 4:
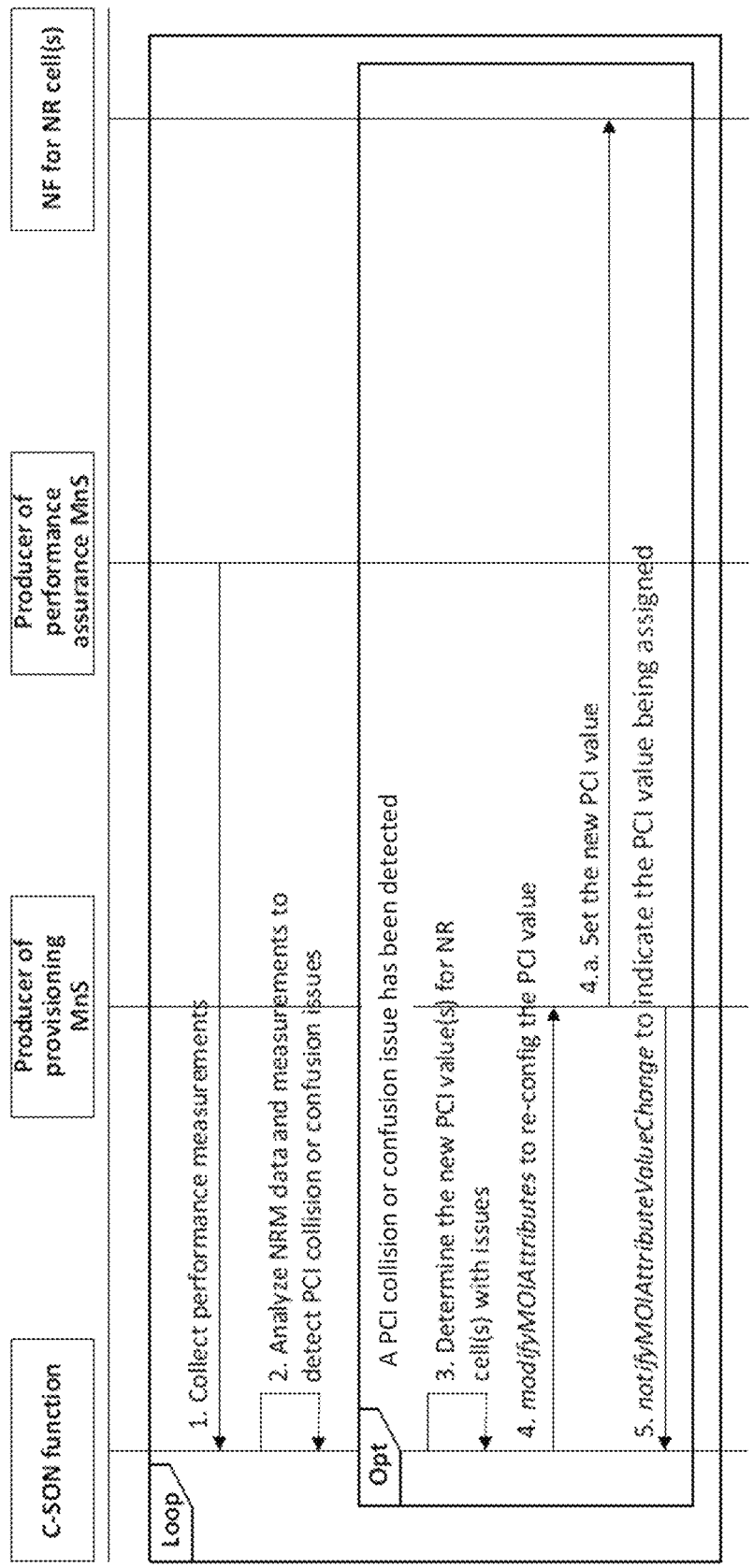
FIG. 4 illustrates a PCI reconfiguration procedure in accordance with some embodiments.

Herein a centralized PCI configuration is used to automatically detect the PCI collision and confusion issues, and determine the action to address the issues. In particular, methods of distributed SON management and centralized SON for PCI configuration are disclosed. FIG. 4 illustrates a PCI reconfiguration procedure in accordance with some embodiments. In particular, FIG. 4 depicts a procedure that describes how a centralized—self organizing network (C-SON) function can re-configure the PCI list for one or more NR cell(s) in response to detection of PCI collision or PCI confusion issues. It is assumed that the C-SON function has consumed the management service (MnS) of performance assurance to create performance management (PM) jobs to collect PCI related measurements.

1. PCI Re-Configuration
  1. The C-SON function collects the PCI of candidate cells measurements (see clause 2) from a producer of performance assurance MnS.
  2. The C-SON function analyzes the network resource model (NRM) data and PCI related measurements to detect the PCI collision or PCI confusion problems for the NR cell(s). For example, measurements of cell #A and cell #D show that the cells both have a neighbor candidate using a PCI value of 10. Since cell #A and cell #D have neighbor relation (known from the NRM), it is possible to find out the PCI value is used in cell #G and small cell #S1 that may cause the PCI collision or confusion.
  3. The C-SON function determines the new PCI value(s) for the NR cell(s).
  4. The C-SON function consumes the MnS of network function (NF) provisioning with modifyMOIAttributes operation to re-configure the PCI value for the NR cell(s). The NR PCI attribute is defined in clause 3.
  4.a. The MnS of NF provisioning sets the PCI value(s) for the NR cell(s).
  5. The producer of provisioning MnS sends a notification notifyMOIAttributeValueChange to the C-SON function to indicate the PCI value(s) being assigned to the NR cell(s).
2. PCI of Candidate Cells A PCI of candidate cells measurement with a subcounter for each PCI received is generated for each NR cell distributed unit (DU) in a granularity interval.
  a) This measurement provides the PCI used by candidate cells. The measurement is derived from MeasResultNR (see clause 6.3.2 in TS 38.331 v15.8.0 (2019-12)) where it contains PhysCellId to indicate the PCI value of the candidate cells, and contains subcounters per PCI to indicate the number of MeasResultListNR with such PCI value being received in a granularity interval.
  b) CC.
  c) This measurement is obtained by incrementing the subcounter, corresponding the PCI value received in MeasResultNR For example, a MeasResultNR with PhysCellId=PCI #1 is received. The subcounter identified by PCI #1 is incremented. The total number of subcounters equals to the number of unique PCI values being received in the interval.
  d) Each measurement is an integer value.
  e) PCIsofCandidateCell.x, where x identifies the subcounter associated with the PCI value.
  f) NRCellDU.
  g) Valid for packet switched traffic.
  h) 5GS.
  i) One usage of this measurement is to support centralized SON function of PCI re-configuration (see TS 28.313 v0.2.0 (2020-01-02)).

Figure 5:
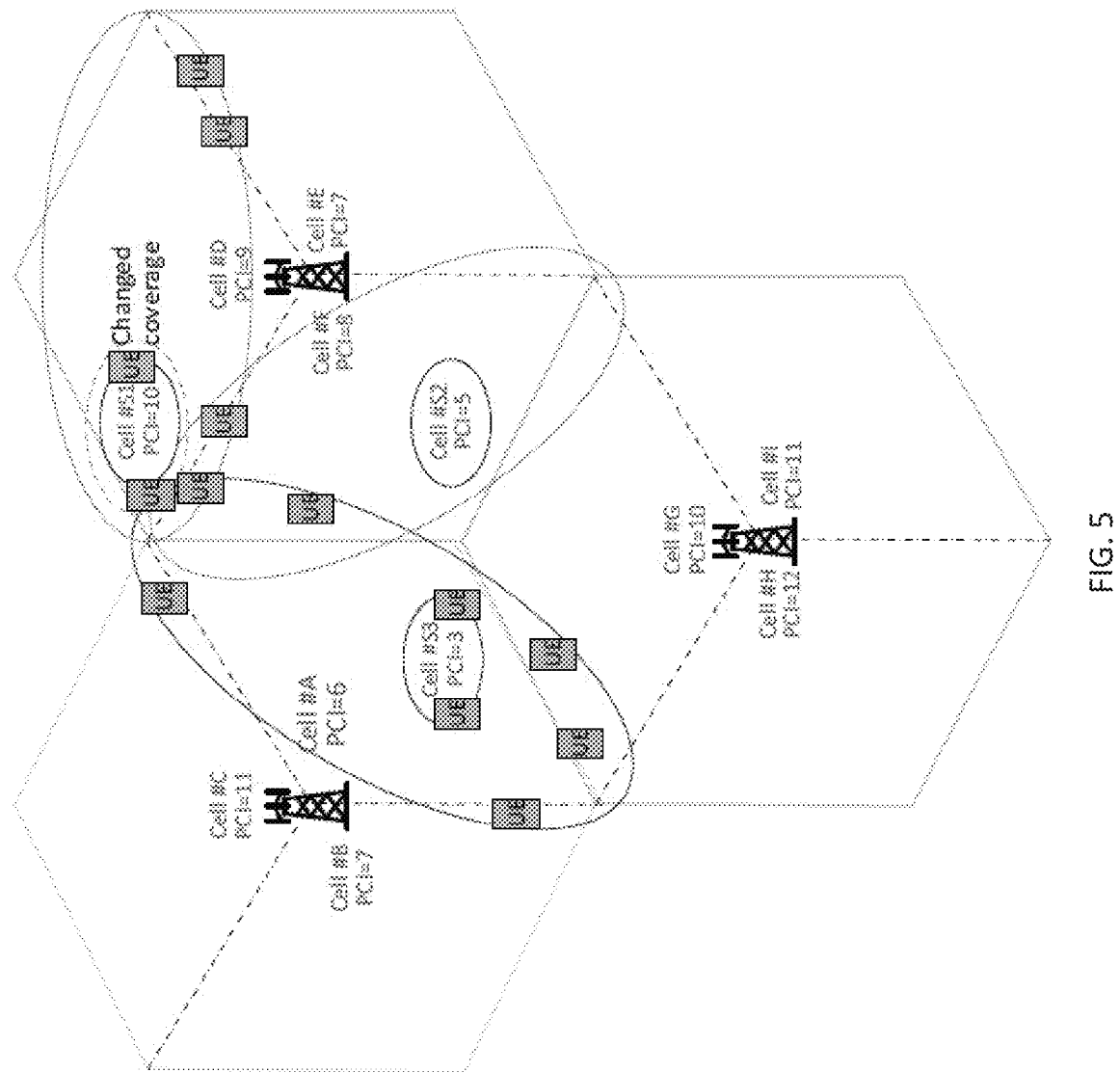
FIG. 5 illustrates a PCI configuration in accordance with some embodiments.

FIG. 5 illustrates a PCI configuration in accordance with some embodiments. Based on the example in FIG. 5, two measurements can be generated in Cell #A (from the UEs shown in upward diagonal hatching oval) and Cell #D (from the UEs shown in the lateral diamond hashing oval).

| Cell #A: | |
|---|---|
| subcounter with PCI = 7: | 1 |
| subcounter with PCI = 11: | 1 |
| subcounter with PCI = 3: | 2 |
| subcounter with PCI = 10: | 3 |
| subcounter with PCI = 8: | 2 |
| Cell #D: | |
| subcounter with PCI = 8: | 1 |
| subcounter with PCI = 10: | 1 |
| subcounter with PCI = 7: | 2 |

3. Parameters to be Updated

The table below lists the parameter related to the distributed—SON (D-SON) PCI configuration function.

| Parameters | Definition | Legal Values |
|---|---|---|
| PCI list | The list of PCI values to be used by D-SON PCI configuration function to assign the PCI for NR cells. | List of integers |
| NR PCI | This parameter contains the PCI of the NR cell (see nrPCI attribute in clause 4.4.1 TS 28.541 v16.3.0 (2020-01-02)). | Integer |

Figure 6:
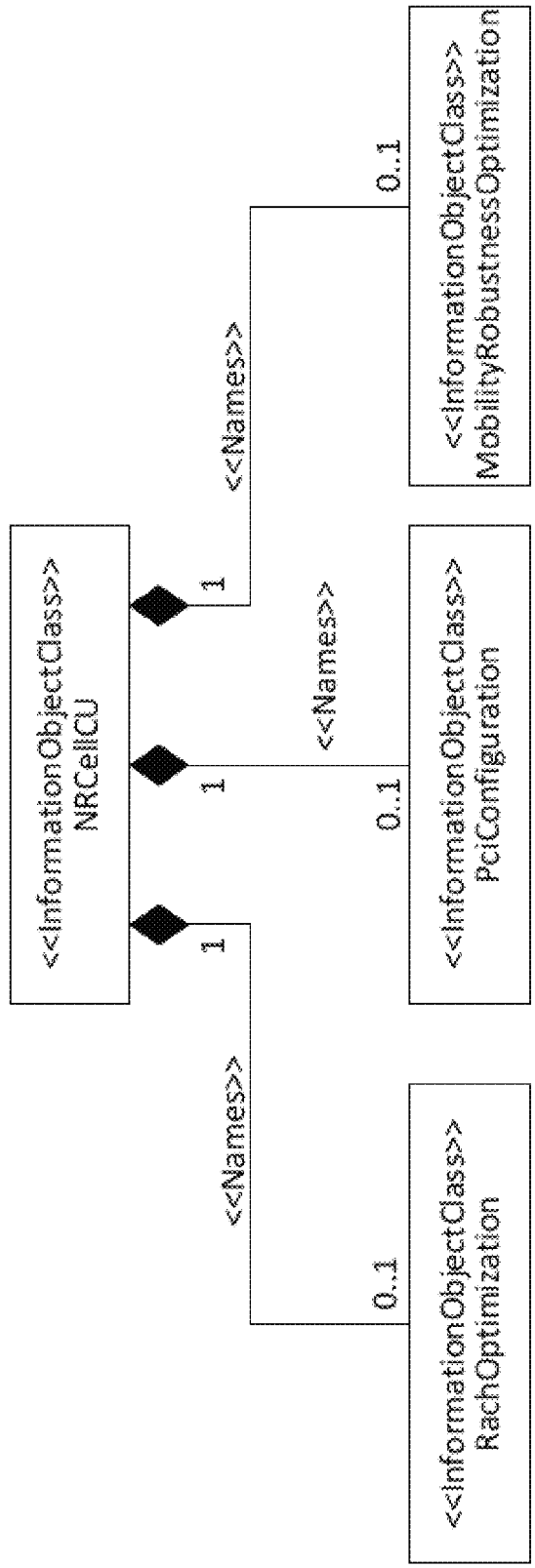
FIG. 6 illustrates a SON functions network resource model (NRM) fragment in accordance with some embodiments.

FIG. 6 illustrates a self-organizing network (SON) functions network resource model (NRM) fragment in accordance with some embodiments. The definition of PciConfiguration information object class (IOC) is provided below.

4.3.z PCIConfiguration 4.3.z.1 Definition

This IOC contains attributes to support the SON function of PCI configuration (See clause 7.1.3 in TS 28.313 v0.2.0 (2020-01-02)).

4.3.z.2 Attributes

| Attribute name | Support Qualifier | isReadable | isWritable | isInvariant | isNotifyable |
|---|---|---|---|---|---|
| pciConfiguration Control | CM | M | M | — | M |
| pciList | CM | M | M | — | M |

4.3.z.3 Attribute Constraints

| Name | Definition |
| --- | --- |
| pciConfigurationControl CM Support Qualifier | PCI configuration is supported |
| pciList CM Support Qualifier | PCI configuration is supported |

4.3.z.4 Notifications

The common notifications defined in subclause 4.5 are valid for this IOC, without exceptions or additions

| | | |
| --- | --- | --- |
| pciList | This holds a list of physical cell identities that can be assigned to the NR cells. This attribute shall be supported if C-SON or D-SON PCI configuration function is supported. See subclause 8.2.3, 8.3.1 in TS 28.313 [x]. allowedValues: See TS 38.211 [32] subclause 7.4.2 for legal values of pci. The number of pci in the list is 0 to 1007. | type: Integer multiplicity: 1..* isOrdered: N/A isUnique: N/A defaultValue: None isNullable: False |
| pciConfiguration Control | This attribute determines whether the PCI configuration function is enabled of disabled. allowedValues: On, Off | type: <<enumeration>> multiplicity: 1 isOrdered: N/A isUnique: N/A defaultValue: None isNullable: True |

Figure 7:
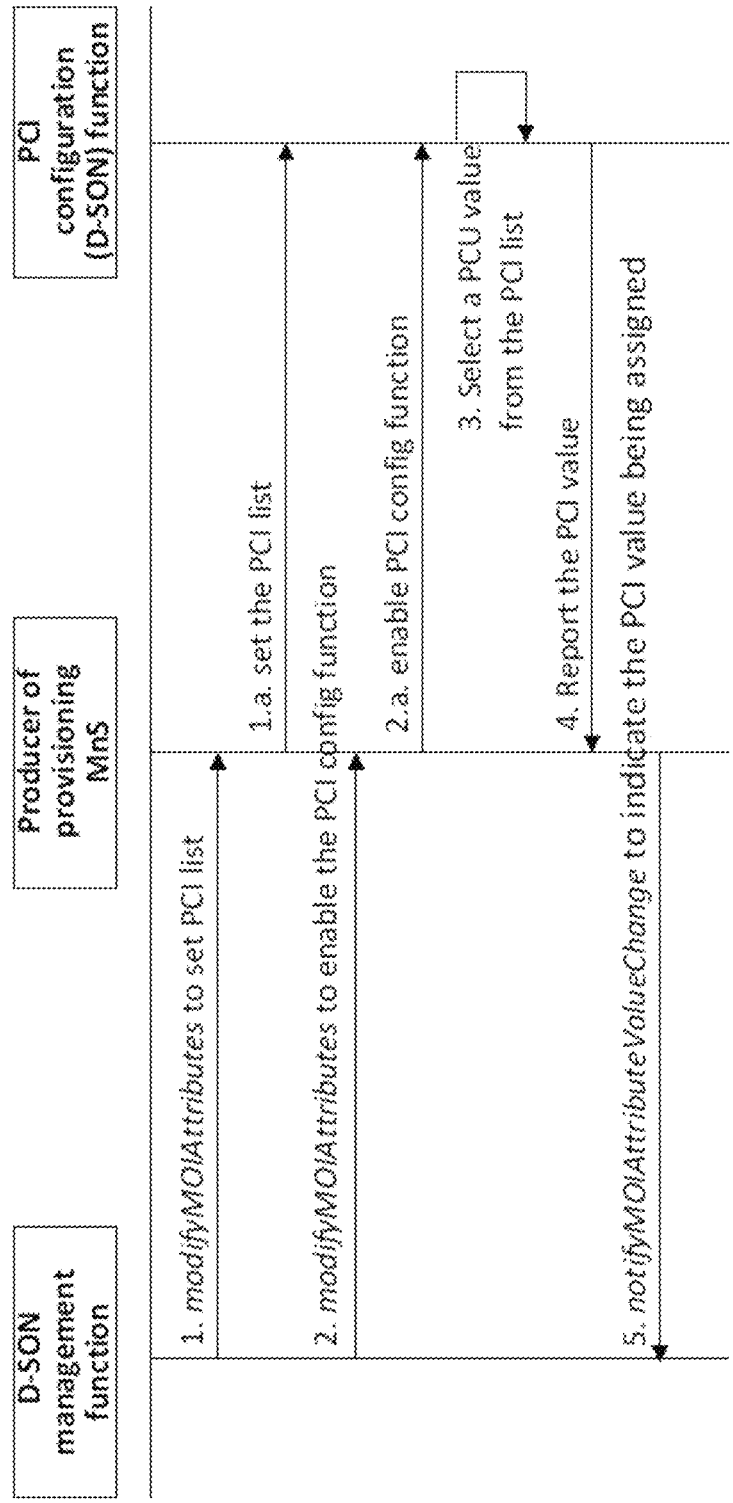
FIG. 7 illustrates an initial PCI configuration procedure in accordance with some embodiments.

8.2 Distributed SON Management
8.2.3 PCI Configuration
8.2.3.1 Initial PCI Configuration FIG. 7 illustrates an initial PCI configuration procedure in accordance with some embodiments. FIG. 7 depicts a procedure that describes how D-SON management function can manage the PCI configuration (D-SON) function to assign the PCI values to NR cells the first time.

1. The D-SON management function consumes the MnS of NF provisioning with modifyMOIAttributes operation to configure the PCI list (defined in pciList in PciConfiguration IOC in clause 3) for NR cell(s).
1.a. The MnS of provisioning sets the PCI list at the PCI configuration (D-SON) function.
2. The D-SON management function consumes the MnS of NF provisioning with modifyMOIAttributes operation to enable the PCI configuration function (defined in pciConfigurationControl in PciConfiguration IOC in clause 3) for the NR cell(s).
2.a. The MnS of provisioning enables the PCI configuration (D-SON) function.
3. The PCI configuration (D-SON) function selects PCI value(s) from the PCI list.
4. The PCI configuration (D-SON) function reports the PCI value(s) being assigned to the MnS of NF provisioning.
5. The MnS of NF provisioning sends a notification notifyMOIAttributeValueChange to the D-SON management function to indicate the PCI value(s) being assigned to the NR cell(s).

One objective of MRO is to dynamically improve the handover performance in order to improve end-user experience as well as increase network capacity. This is done by automatically configuring the handover parameters to adjust handover boundaries based on the analysis of handover related performance measurements and radio link failure events. One objective is to eliminate Radio Link Failures (RLFs) and reduce unnecessary handovers.

Figure 8:
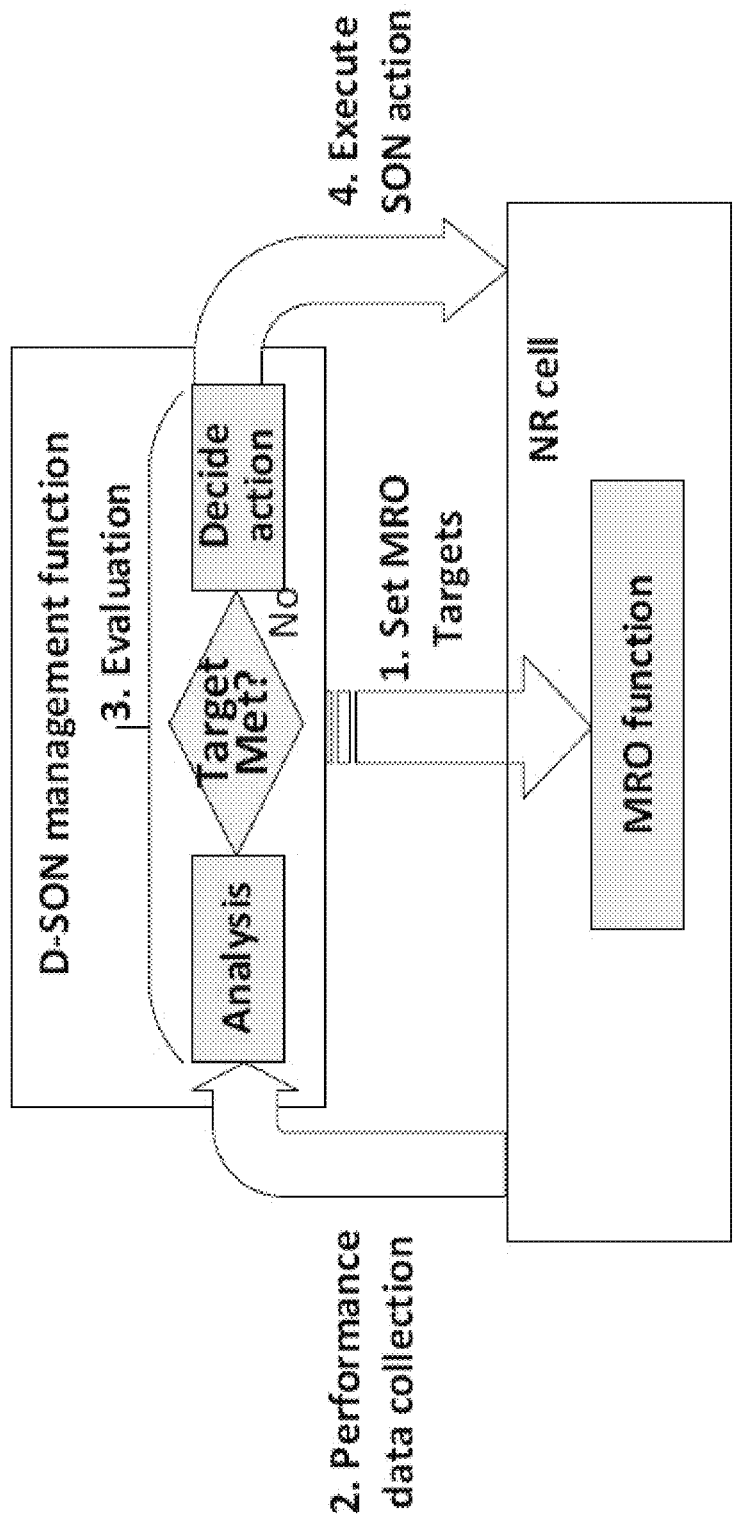
FIG. 8 illustrates an MRO flow diagram in accordance with some embodiments.

FIG. 8 illustrates a mobility robustness optimization (MRO) flow diagram in accordance with some embodiments. In FIG. 8:

1. The distributed—self-organizing network (D-SON) management function sets the MRO target at the MRO function.
2. The D-SON management function collects the performance data.
3. The D-SON management function evaluates the MRO performance by analyzing the performance data to determine if the target is met. If, not, it will decide an action to improve the MRO performance.

The D-SON management function executes the action.

The techniques herein are for mobility robustness optimization for 5G networks that may be implemented in updates of TS 28.313 v0.2.0 (2020-01-02), TS 28.541 (2020-01-02), and TS 28.552. MRO includes both MRO procedures and information used to support MRO.

1. MRO

Figure 9:
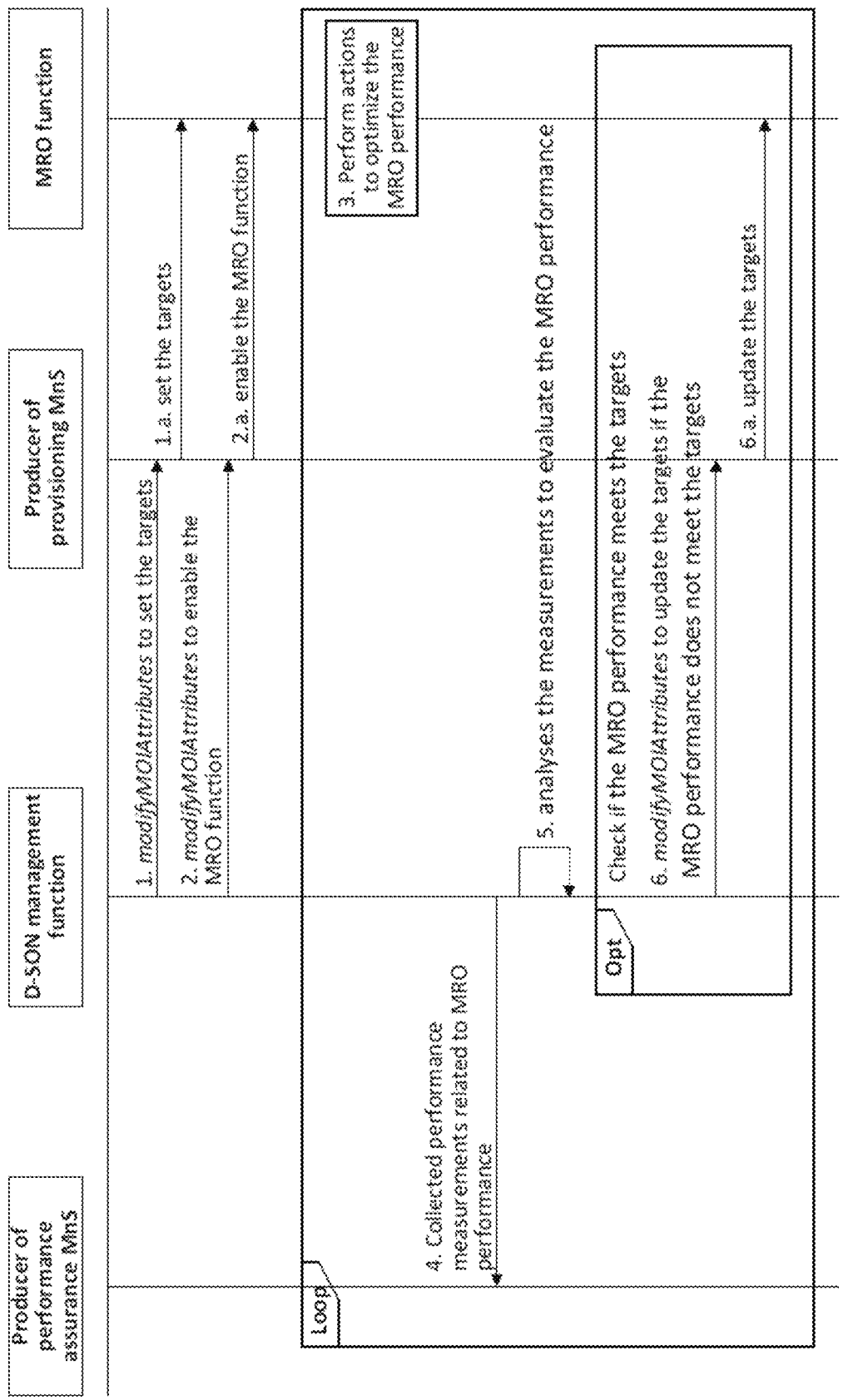
FIG. 9 illustrates an MRO procedure in accordance with some embodiments.

FIG. 9 illustrates an MRO procedure in accordance with some embodiments. FIG. 9 depicts a procedure that describes how the D-SON management function can manage the MRO function. It is assumed that the D-SON management function has consumed the performance assurance management service (MnS) to create performance management (PM) jobs to collect handover related measurements.

1. The D-SON management function consumes the provisioning MnS with modifyMOIAttributes operation (see clause 5.1.3 in TS 28.532 v16.2.0 (2020-01-02)) to configure targets for the MRO function.
1.a The provisioning MnS sets the targets for the MRO function.
2. The D-SON management function consumes the NF provisioning MnS with modifyMOIAttributes operation to enable the MRO function for a given NR cell.
2.a The provisioning MnS enables the MRO function.
3. The MRO function receives MRO information reports from UE(s) and analyses them to determine the actions to optimize the MRO performance. If the performance does not meet the targets, it updates the handover parameters.
4. The D-SON management function collects MRO related performance measurements.
5. The D-SON management function analyses the measurements to evaluate the MRO performance.
6. The D-SON management function consumes the provisioning MnS with modifyMOIAttributes operation to update the targets of the MRO function if the MRO performance does not meet the targets.
6.a The provisioning MnS updates the targets for MRO function 2. Information to Support MRO
2.1 MnS Component Type A

| MnS Component Type A | Note |
| --- | --- |
| Operations defined in clause 5 of TS 28.532: getMOIAttributes operation modifyMOIAttributes operation notifyMOIAttributeValueChange operation | It is supported by Provisioning MnS for NF, as defined in 28.531 v16.4.0 (2020-01-02). |
| Operations defined in clause 11.3.1.1.1 in TS 28.532 and clause 6.2.3 of TS 28.550 v16.3.0 (2020-01-02): notifyFileReady operation reportStreamData operation | It is supported by Performance Assurance MnS for NFs, as defined in 28.550. |

2.2 MnS Component Type B Definition

Figure 10:
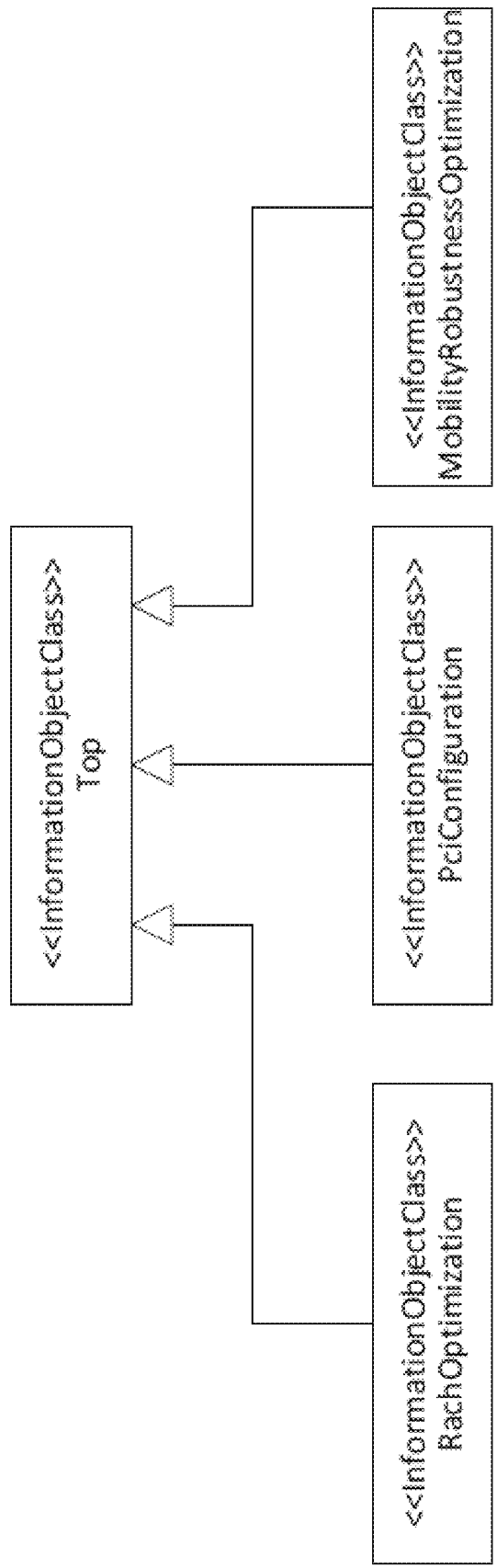
FIG. 10 illustrates inheritance Hierarchy in accordance with some embodiments.

FIG. 10 illustrates Inheritance Hierarchy in accordance with some embodiments.

4.3.y MobilityRobustnessOptimization 4.3.y.1 Definition

This IOC contains attributes to support the SON function of MRO (See clause 7.1.2 in TS 28.313).

4.3.y.2 Attributes

| Attribute name | Support Qualifier | isReadable | isWritable | isInvariant | isNotifyable |
|---|---|---|---|---|---|
| totalHoFailureRate | CM | M | M | — | M |
| intraRATHoFailureRate | CM | M | M | — | M |
| intraRATTooEarlyHoFailureRate | CM | M | M | — | M |
| intraRATTooLateHoFailureRate | CM | M | M | — | M |
| intraRATHoToWrongCellFailureRate | CM | M | M | — | M |
| interRATHoFailureRate | CM | M | M | — | M |
| interRATTooEarlyHoFailureRate | CM | M | M | — | M |
| interRATTooLateHoFailureRate | CM | M | M | — | M |
| interRATUnnecessaryHoFailureRate | CM | M | M | — | M |
| interRATPingPongHoFailureRate | CM | M | M | — | M |
| mroControl | CM | M | M | — | M |

4.3.y.3 Attribute Constraints

| Name | Definition |
|---|---|
| totalHoFailureRate CM Support Qualifier | MRO is supported |
| intraRATHoFailureRate CM Support Qualifier | MRO is supported |
| intraRATTooEarlyHoFailureRate CM Support Qualifier | MRO is supported |
| intraRATTooLateHoFailureRate CM Support Qualifier | MRO is supported |
| intraRATHoToWrongCellFailureRate CM Support Qualifier | MRO is supported |
| interRATHoFailureRate CM Support Qualifier | MRO is supported |
| interRATTooEarlyHoFailureRate CM Support Qualifier | MRO is supported |
| interRATTooLateHoFailureRate CM Support Qualifier | MRO is supported |
| interRATUnnecessaryHoFailureRate CM Support Qualifier | MRO is supported |
| interRATPingPongHoFailureRate CM Support Qualifier | MRO is supported |
| mroControl CM Support Qualifier | MRO is supported |

4.3.y.4 Notifications

The common notifications defined in subclause 4.5 are valid for this IOC, without exceptions or additions 2.2.1 Targets Information The targets of MRO are shown in the Table 7.1.2.2.1-1.

TABLE 7.1.2.2.1-1

MRO targets

| Target Name | Definition | Legal Values |
|---|---|---|
| Total handover failure rate | (the number of failure events related to handover)/(the total number of handover events) | [0..100] in unit percentage |
| Total intra-RAT handover failure rate | (the number of failure events related to intra-RAT handover)/(the total number of handover events) | [0..100] in unit percentage |
| Intra-RAT too early handover failure rate | (the number of too early handover failure events related to intra-RAT handover)/(the total number of handover events) | [0..100] in unit percentage |
| Intra-RAT too late handover failure rate | (the number of too late handover failure events related to intra-RAT handover)/(the total number of handover events) | [0..100] in unit percentage |
| Intra-RAT handover to wrong cell failure rate | (the number of handover to wrong cell failure events related to intra-RAT handover)/(the total number of handover events) | [0..100] in unit percentage |

TABLE 7.1.2.2.1-1-continued

MRO targets

| Target Name | Definition | Legal Values |
| --- | --- | --- |
| Total inter-RAT handover failure rate | (the number of failure events related to inter-RAT handover)/(the total number of handover events) | [0..100] in unit percentage |
| Inter-RAT too early handover failure rate | (the number of failure events related to inter-RAT too early handover)/(the total number of handover events) | [0..100] in unit percentage |
| Inter-RAT too late handover failure rate | (the number of failure events related to inter-RAT too late handover)/(the total number of handover events) | [0..100] in unit percentage |
| Inter-RAT unnecessary handover failure rate | (the number of failure events related to inter-RAT unnecessary handover)/(the total number of handover events) | [0..100] in unit percentage |
| Inter-RAT ping-pong handover failure rate | (the number of failure events related to inter-RAT ping-pong handover)/(the total number of handover events) | [0..100] in unit percentage |

Target Attribute Definitions:

| | | |
| --- | --- | --- |
| totalHoFailureRate | This indicates the target of the number of handover failure events divided by the total number of handover events, together with its targetWeight.<br>This target is suitable for MRO or local breakout (LBO).<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| intraRATHoFailureRate | This indicates the assigned target of the number of handover failure events divided by the total number of intra-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| intraRATTooEarlyHoFailureRate | This indicates the assigned target of the number of too early handover failure events divided by the total number of intra-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| intraRATTooLateHoFailureRate | This indicates the assigned target of the number of too late handover failure events divided by the total number of intra-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |

| | | |
|---|---|---|
| intraRATHoToWrongCellFailureRate | This indicates the assigned target of the number of handover to wrong cell failure events divided by the total number of intra-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| interRATHoFailureRate | This indicates the assigned target of the number of handover failure events divided by the total number of inter-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| interRATTooEarlyHoFailureRate | This indicates the assigned target of the number of too early handover failure events divided by the total number of inter-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| interRATTooLateHoFailureRate | This indicates the assigned target of the number of too late handover failure events divided by the total number of inter-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| interRATUnnecessaryHoFailureRate | This indicates the assigned target of the number of unnecessary handover failure events divided by the total number of inter-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |
| interRATPingPongHoFailureRate | This indicates the assigned target of the number of ping-pong handover failure events divided by the total number of inter-RAT handover events, together with its targetWeight.<br>This target is suitable for MRO or LBO.<br>allowedValues:<br>hoFailureRate:<br>Integer 1..100 (percentage).<br>targetWeight:<br>Integer 1..N. The higher the number the higher the weight. | type: <<data type>><br>multiplicity: 0..*<br>isOrdered: N/A<br>isUnique: N/A<br>defaultValue: None<br>isNullable: True |

2.2.2 Control Information

The parameter is used to control the MRO function.

| Control parameter | Definition | Legal Values |
|---|---|---|
| MRO function control | This attribute allows the operator to enable/disable the MRO functionality. | Boolean On, off |

| | | |
|---|---|---|
| mroControl | This attribute determines whether the MRO function is enabled or disabled. allowedValues: On, Off | type: <<enumeration>> multiplicity: 1 isOrdered: N/A isUnique: N/A defaultValue: None isNullable: True |

2.2.3 Parameters to be Updated
2.3 MnS Component Type C Definition
23.1 Performance Measurements Performance measurements related MRO are captured in Table 7.1.2.3.1-1:

TABLE 7.1.2.3.1-1

MRO related performance measurements

| Performance measurements | Description | Related targets |
|---|---|---|
| Number of handover events | Includes all successful and unsuccessful handover events (see clause 5.1.1.6 in TS 28.552 [5]). | Total handover failure rate |
| Number of handover failures | Includes unsuccessful handover events with failure causes (see clause 5.1.1.6 in TS 28.552 [5]). | Total handover failure rate |
| Number of intra-RAT handover events | Includes all successful and unsuccessful intra-RAT handover events1 | Total intra-RAT handover failure rate |
| Number of intra-RAT handover failures | Includes unsuccessful intra-RAT handover events with failure causes. | Total intra-RAT handover failure rate |
| Number of inter-RAT handover events | Includes all successful and unsuccessful inter-RAT handover events. | Total inter-RAT handover failure rate |
| Number of inter-RAT handover failures | Includes unsuccessful inter-RAT handover events with failure causes. | Total inter-RAT handover failure rate |
| Number of inter-RAT too early handover failures | Detected when an RLF occurs after the UE has stayed for a long period of time in the cell. | Intra-RAT too early handover failure rate |
| Number of intra-RAT too late handover failures | Detected when an RLF occurs shortly after a successful handover from a source cell to a target cell or a handover failure occurs during the handover procedure. | Intra-RAT too late handover failure rate |
| Number of intra-RAT handover failures to wrong cell | Detected when an RLF occurs shortly after a successful handover from a source cell to a target cell or a handover failure occurs during the handover procedure. | Intra-RAT handover to wrong cell failure rate |
| Number of inter-RAT too early handover failures | Detected when an RLF occurs after the UE has stayed in an E-UTRAN cell which connects with 5GC for a long period of time. | Inter-RAT too early handover failure rate |
| Number of inter-RAT too late handover failures | Detected when an RLF occurs shortly after a successful handover from an E-UTRAN cell which connects with EPC to a target cell in a E-UTRAN cell which connects with 5GC. | Inter-RAT too late handover failure rate |
| Number of unnecessary handover to another RAT | Detected when a UE is handed over from NG-RAN to other system (e.g. UTRAN) even though quality of the NG-RAN coverage was sufficient for the service used by the UE. | Inter-RAT unnecessary handover failure rate |
| Number of inter-RAT handover ping pong | Detected when an UE is handed over from a cell in a source system (e.g. NG-RAN) to a cell in a target system different from the source system (e.g. E-UTRAN), then within a predefined limited time the UE is handed over back to a cell in the source system, while the coverage of the source system was sufficient for the service used by the UE. | Inter-RAT ping-pong handover failure rate |

Performance Measurements Definition 5.1. Lx Measurements Related to MRO 5.1.1.x.1 Handover Failures Related to MRO for Intra-System Mobility
- a) This measurement provides the number of handover failure events related to MRO detected during the intra-system mobility within 5GS. The measurement includes separate counters for various handover failure types, classified as "too early handover", "too late handover" and "handover to wrong cell".
- b) CC.
- c) The measurements of too early handovers, too late handovers and handover to wrong cell events are obtained respectively by accumulating the number of failure events detected by gNB during the intra-system mobility within 5GS.
- d) Each measurement is an integer value.
- e) HO.IntraSys.TooEarly
  HO.IntraSys.TooLate
  HO.IntraSys.HandoverToWrongCell
- f) NRCellCU.
  NRCellRelation
- g) Valid for packet switched traffic.
- h) 5GS.
- i) One usage of this measurement is to support MRO (see TS 28.313).

5.1.1.x.2 Handover Failures Related to MRO for Inter-System Mobility
- a) This measurement provides the number of handover failure events delated to MRO detected during the inter-system mobility from 5GS to EPS. The measurement includes separate counters for various handover failure types, classified as "too early handover" and "too late handover."
- b) CC.
- c) The measurements of too early handovers and too late handovers events are obtained respectively by accumulating the number of failure events detected by gNB during the inter-system mobility from 5GS to EPS.
- d) Each measurement is an integer value.
- e) HO.InterSys.TooEarly
  HO.InterSys.TooLate
- f) NRCellCU.
  EutranRelation
- g) Valid for packet switched traffic.
- h) 5GS.
- i) One usage of this measurement is to support MRO (see TS 28.313).

5.1.1.x.3 Unnecessary Handovers for Inter-System Mobility
- a) This measurement provides the number of unnecessary handover events detected during the inter-system mobility from 5GS to EPS. An example of unnecessary handover occurred when a UE handed over from NG-RAN to other system (e.g. UTRAN) even though quality of the NG-RAN coverage was sufficient.
- b) CC.
- c) The measurement of unnecessary handovers are obtained by accumulating the number of failure events detected gNB during the inter-system mobility from 5GS to EPS.
- d) Each measurement is an integer value.
- e) HO.InterSys.UnnecessaryHandover
- f) NRCellCU.
  EutranRelation
- g) Valid for packet switched traffic.
- h) 5GS.
- i) One usage of this measurement is to support MRO (see TS 28.313).

5.1.1.x4 Handover Ping-Pong for Inter-System Mobility
- a) This measurement provides the number of handover ping-pong events detected during the inter-system mobility from 5GS to EPS. An example of handover ping-pong occurred when a UE is handed over from a cell in a source system (e.g., NG-RAN) to a cell in a target system different from the source system (e.g. E-UTRAN), then within a predefined limited time the UE is handed over back to a cell in the source system, while the coverage of the source system was sufficient for the service used by the UE.
- b) CC.
- c) The measurement of handover ping-pong events are obtained by accumulating the number of failure events detected by gNB during the inter-system mobility from 5GS to EPS.
- d) Each measurement is an integer value.
- e) HO.InterSys.Ping-pongHandover
- f) NRCellCU.
  EutranRelation
- g) Valid for packet switched traffic.
- h) 5GS.
- i) One usage of this measurement is to support MRO (see TS 28.313).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a new radio (NR) network configured to operate as a Centralized Self-Organizing Network (C-SON) function, the apparatus comprising:
processing circuitry to configure the C-SON function to:
receive, from a producer of performance assurance Management Service (MnS), performance measurements and a Physical Layer Cell Identity (PCI) of candidate cells measurements for each of a plurality of NR cells, the PCI of candidate cells measurements containing subcounters per PCI to indicate a number of MeasResultListNR information elements (IEs) with a PCI value being received in a granularity interval;
obtain the PCI of candidate cells measurements by incrementing a subcounter corresponding to a PCI value received in a MeasResultNR IE, a total number of subcounters equaling a number of unique PCI values received in the granularity interval;
analyze network resource model (NRM) data and the PCIs to detect a potential PCI collision or PCI confusion among the NR cells;
determine, in response to the detection of potential PCI collision or PCI confusion for at least one NR cell of the NR cells, a new PCI value for the at least one of the NR cells, the new PCI value selected to avoid potential PCI collision or PCI confusion among neighboring NR cells of the at least one NR cell; and
send, to a producer of provisioning MnS, instructions to re-configure the at least one NR cell with the new PCI value; and
a memory to store the PCI of the candidate cells measurements.

2. The apparatus of claim 1, wherein the C-SON function is configured to consume a MnS of NF provisioning with modifyMOIAttributes operation to re-configure the at least one NR cell with the new PCI value.

3. The apparatus of claim 2, wherein the C-SON function is configured to receive, from the producer of provisioning MnS, a notification notifyMOIAttributeValueChange to indicate the new PCI value being assigned to the at least one NR cell.

4. The apparatus of claim 1, wherein the processing circuitry further configures the C-SON function to derive the PCI of one of the candidate cells from a MeasResultNR information element (IE) that contains a PhysCellId to indicate the PCI value of the candidate cell.

5. The apparatus of claim 1, wherein the PCI of the candidate cells measurements is generated in each NR cell distributed unit (DU) in the granularity interval.

6. The apparatus of claim 1, wherein the processing circuitry further configures the C-SON function to, in response to detection of the potential PCI collision or PCI confusion among NR cells, re-configure a PCI list of PCI values to be used by a Distributed SON (D-SON) PCI configuration function to assign the new PCI value for the at least one NR cell.

7. An apparatus for a new radio (NR) network configured to operate as a Centralized Self-Organizing Network (C-SON) function, the apparatus comprising:
processing circuitry to configure the C-SON function to:
receive, from a producer of performance assurance Management Service (MnS), performance measurements and a Physical Layer Cell Identity (PCI) of candidate cells measurements for each of a plurality of NR cells, the PCI of candidate cells measurements containing subcounters per PCI to indicate a number of MeasResultListNR information elements (IEs) with a PCI value being received in a granularity interval, the PCI of the candidate cells measurements generated in each NR cell distributed unit (DU) in the granularity interval;
analyze network resource model (NRM) data and the PCIs to detect a potential PCI collision or PCI confusion among the NR cells;
determine, in response to the detection of potential PCI collision or PCI confusion for at least one NR cell of the NR cells, a new PCI value for the at least one of the NR cells, the new PCI value selected to avoid potential PCI collision or PCI confusion among neighboring NR cells of the at least one NR cell; and
send, to a producer of provisioning MnS, instructions to re-configure the at least one NR cell with the new PCI value; and
a memory to store the PCI of the candidate cells measurements.

8. The apparatus of claim 7, wherein the C-SON function is configured to consume a MnS of NF provisioning with modifyMOIAttributes operation to re-configure the at least one NR cell with the new PCI value.

9. The apparatus of claim 8, wherein the C-SON function is configured to receive, from the producer of provisioning MnS, a notification notifyMOIAttributeValueChange to indicate the new PCI value being assigned to the at least one NR cell.

10. The apparatus of claim 7, wherein the processing circuitry further configures the C-SON function to derive the PCI of one of the candidate cells from a MeasResultNR information element (IE) that contains a PhysCellId to indicate the PCI value of the candidate cell.

11. The apparatus of claim 7, wherein the processing circuitry further configures the C-SON function to, in response to detection of the potential PCI collision or PCI confusion among NR cells, re-configure a PCI list of PCI values to be used by a Distributed SON (D-SON) PCI configuration function to assign the new PCI value for the at least one NR cell.

12. A non-transitory computer-readable storage medium that stores instructions for execution by one or more processors of an apparatus for a new radio (NR) network configured to operate as a Centralized Self-Organizing Network (C-SON) function, the one or more processors configure the C-SON function to, when the instructions are executed:
receive, from a producer of performance assurance Management Service (MnS), performance measurements and a Physical Layer Cell Identity (PCI) of candidate cells measurements for each of a plurality of NR cells, the PCI of candidate cells measurements containing subcounters per PCI to indicate a number of MeasResultListNR information elements (IEs) with a PCI value being received in a granularity interval;
obtain the PCI of candidate cells measurements by incrementing a subcounter corresponding to a PCI value received in a MeasResultNR IE, a total number of subcounters equaling a number of unique PCI values received in the granularity interval;
analyze network resource model (NRM) data and the PCIs to detect a potential PCI collision or PCI confusion among the NR cells;
determine, in response to the detection of potential PCI collision or PCI confusion for at least one NR cell of the NR cells, a new PCI value for the at least one of the NR cells, the new PCI value selected to avoid potential PCI collision or PCI confusion among neighboring NR cells of the at least one NR cell; and
send, to a producer of provisioning MnS, instructions to re-configure the at least one NR cell with the new PCI value.

13. The medium of claim 12, wherein the one or more processors further configure the C-SON function to, when the instructions are executed, consume a MnS of NF provisioning with modifyMOIAttributes operation to re-configure the at least one NR cell with the new PCI value.

14. The medium of claim 13, wherein the one or more processors further configure the C-SON function to, when the instructions are executed, receive, from the producer of provisioning MnS, a notification notifyMOIAttributeValueChange to indicate the new PCI value being assigned to the at least one NR cell.

15. The medium of claim 12, wherein the one or more processors further configure the C-SON function to, when the instructions are executed, derive the PCI of one of the candidate cells from a MeasResultNR information element (IE) that contains a PhysCellId to indicate the PCI value of the candidate cell.

16. The medium of claim 12, wherein the one or more processors further configure the C-SON function to, when the instructions are executed, in response to detection of the potential PCI collision or PCI confusion among NR cells, re-configure a PCI list of PCI values to be used by a Distributed SON (D-SON) PCI configuration function to assign the new PCI value for the at least one NR cell.

* * * * *